US008838563B2

(12) United States Patent
Berkowitz et al.

(10) Patent No.: US 8,838,563 B2
(45) Date of Patent: Sep. 16, 2014

(54) METHOD AND SYSTEM FOR ROUTING A TELEPHONE CALL

(75) Inventors: Michael Berkowitz, Alon Shvut (IL); David Mark Schwartz, Ginot Shomron (IL)

(73) Assignee: XConnect Global Networks Limited (GB)

( * ) Notice: Subject to any disclaimer, the term of this patent is extended or adjusted under 35 U.S.C. 154(b) by 600 days.

(21) Appl. No.: 12/832,274

(22) Filed: Jul. 8, 2010

(65) Prior Publication Data
US 2012/0008760 A1   Jan. 12, 2012

(51) Int. Cl.
  *G06F 17/30* (2006.01)
  *H04Q 3/66* (2006.01)
(52) U.S. Cl.
  CPC ....... *H04Q 3/66* (2013.01); *H04Q 2213/13141* (2013.01); *H04Q 2213/1305* (2013.01); *H04Q 2213/13103* (2013.01)
  USPC ....... 707/706; 707/769; 707/797; 379/221.14
(58) Field of Classification Search
  None
  See application file for complete search history.

(56) References Cited

U.S. PATENT DOCUMENTS

| 5,623,541 A * | 4/1997 | Boyle et al. .............. 379/221.15 |
| 6,907,032 B2 * | 6/2005 | Eastman ....................... 370/352 |
| 2003/0026246 A1 * | 2/2003 | Huang et al. .................. 370/352 |
| 2008/0198997 A1 | 8/2008 | Sterman |

FOREIGN PATENT DOCUMENTS

| EP | 0727913 A2 | 8/1996 |
| WO | 9534155 | 12/1995 |
| WO | 9600480 | 1/1996 |
| WO | 0167732 | 9/2001 |
| WO | WO 02097676 A2 * | 12/2002 |

OTHER PUBLICATIONS

Riccardi, Principles of Database Systems with Internet and Java Applications, Addison Wesley Publishing Company 2001, pp. 299-308.*

* cited by examiner

*Primary Examiner* — Jacob F Bétit
*Assistant Examiner* — Tyler Torgrimson
(74) *Attorney, Agent, or Firm* — Cantor Colburn LLP

(57) ABSTRACT

An Internet telephony registry 190 comprises a server 140 and an associated data store 160. Routing and/or policy data associated with telephone number strings are stored in the data store 160 in a tree data structure 240 and a data index map 230. The tree data structure 240 comprises parent nodes and leaf nodes and each parent node of the tree data structure 240 has ten child nodes. The tree data structure 240 stores an index associated with each telephone number string and the data index map stores routing and/or policy attributes 233 represented by the indices 232.

16 Claims, 7 Drawing Sheets

270

250a

| | | | | | | | | | | | |
|---|---|---|---|---|---|---|---|---|---|---|---|
| 00 00 00 | 310 | 0 | 1 | 2 | 3 | 4 | 5 | 6 | 7 | 8 | 9 | data |
| 00 00 01 | | 0 | 1 | 2 | 3 | 4 | 5 | 6 | 7 | 8 | 9 | data |
| 00 00 02 | | 0 | 1 | 2 | 3 | 4 | 5 | 6 | 7 | 8 | 9 | data |
| 00 00 03 | 320 | 0 | 1 | 2 | 3 | 4 | 5 | 6 | 7 | 8 | 9 | data |
| 00 00 04 | | 0 | 1 | 2 | 3 | 4 | 5 | 6 | 7 | 8 | 9 | data |
| 00 00 05 | | 0 | 1 | 2 | 3 | 4 | 5 | 6 | 7 | 8 | 9 | data |
| 00 00 06 | | 0 | 1 | 2 | 3 | 4 | 5 | 6 | 7 | 8 | 9 | data |
| 00 00 07 | 330 | 0 | 1 | 2 | 3 | 4 | 5 | 6 | 7 | 8 | 9 | data |
| 00 00 08 | 340 | 0 | 1 | 2 | 3 | 4 | 5 | 6 | 7 | 8 | 9 | data |
| 00 00 09 | | 0 | 1 | 2 | 3 | 4 | 5 | 6 | 7 | 8 | 9 | data |
| 00 00 0A | 350 | 0 | 1 | 2 | 3 | 4 | 5 | 6 | 7 | 8 | 9 | data |
| 00 00 0B | | 0 | 1 | 2 | 3 | 4 | 5 | 6 | 7 | 8 | 9 | data |
| 00 00 0C | | 0 | 1 | 2 | 3 | 4 | 5 | 6 | 7 | 8 | 9 | data |
| 00 00 0D | | 0 | 1 | 2 | 3 | 4 | 5 | 6 | 7 | 8 | 9 | data |
| 00 00 0E | 360 | 0 | 1 | 2 | 3 | 4 | 5 | 6 | 7 | 8 | 9 | data |
| 00 00 0F | | 0 | 1 | 2 | 3 | 4 | 5 | 6 | 7 | 8 | 9 | data |
| 00 00 10 | | 0 | 1 | 2 | 3 | 4 | 5 | 6 | 7 | 8 | 9 | data |
| 00 00 11 | 370 | 0 | 1 | 2 | 3 | 4 | 5 | 6 | 7 | 8 | 9 | data |
| 00 00 12 | | 0 | 1 | 2 | 3 | 4 | 5 | 6 | 7 | 8 | 9 | data |
| 00 00 13 | 380 | 0 | 1 | 2 | 3 | 4 | 5 | 6 | 7 | 8 | 9 | data |
| 00 00 14 | | 0 | 1 | 2 | 3 | 4 | 5 | 6 | 7 | 8 | 9 | data |
| 00 00 15 | | 0 | 1 | 2 | 3 | 4 | 5 | 6 | 7 | 8 | 9 | data |
| 00 00 16 | | 0 | 1 | 2 | 3 | 4 | 5 | 6 | 7 | 8 | 9 | data |
| 00 00 17 | | 0 | 1 | 2 | 3 | 4 | 5 | 6 | 7 | 8 | 9 | data |

Figure 5

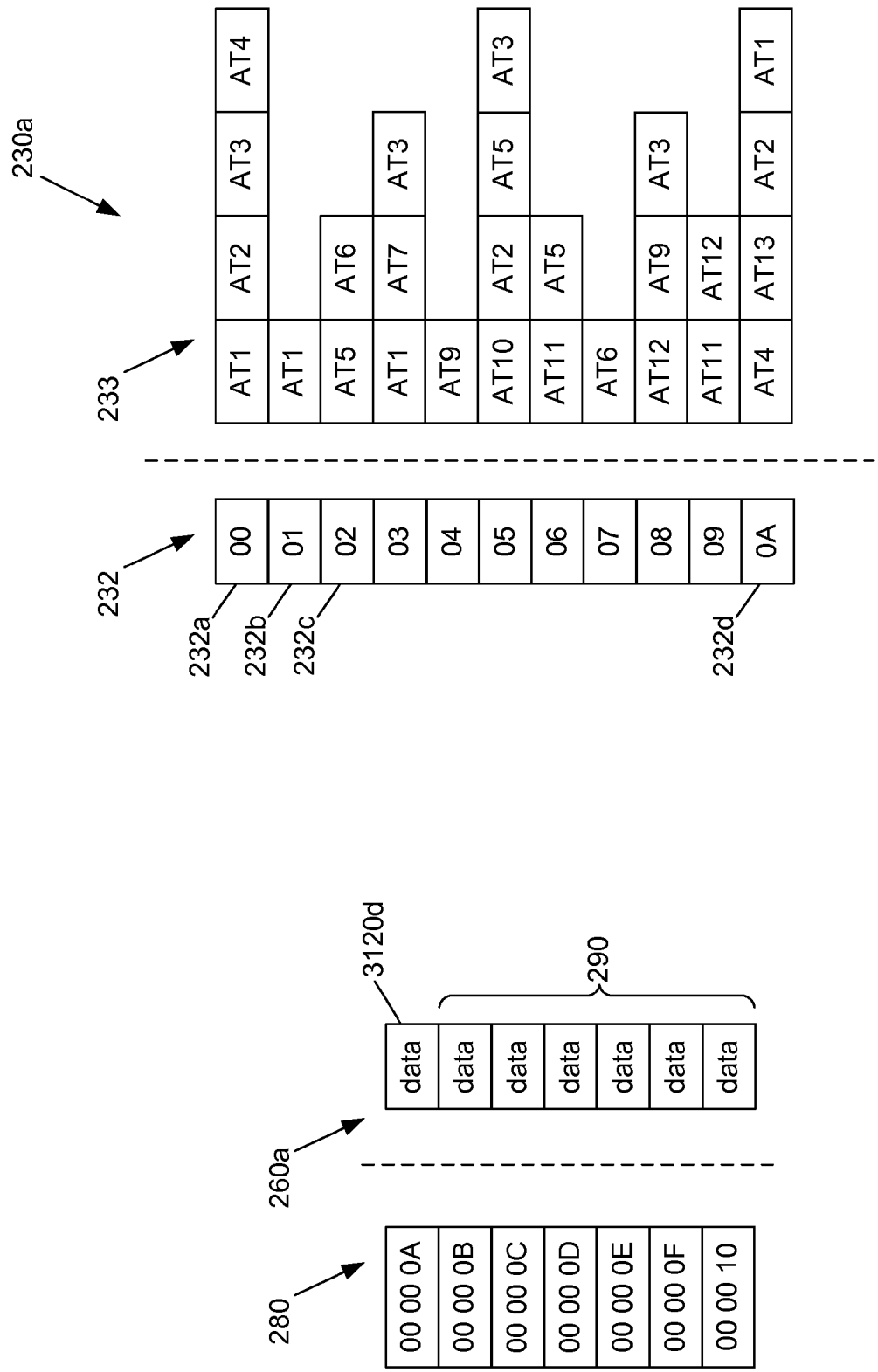

METHOD AND SYSTEM FOR ROUTING A TELEPHONE CALL

FIELD OF THE INVENTION

This invention relates to the routing of telephone calls, for example, via a packet switched network such as the Internet. In particular, this invention relates to a registry for storing data associated with a destination telephone number.

BACKGROUND OF THE INVENTION

In a telephony network, a first user associated with a first user terminal places a call to a second user associated with a second user terminal. The telephony network may be a traditional public switched telephone network (PSTN) or a packet-switched network, such as the Internet. In the case of a packed-switched network, the call may be a voice only call, known as a Voice over Internet Protocol (VoIP) call or the call may be a multi-media call, for example also including video transmission.

Each user terminal is typically associated with identifier data, such as a telephone number conforming to the ITU-T E.164 recommendation. In the PSTN, telephone numbers are used as both primary identifiers and as routing labels for switching circuits to establish a telephone call.

For example, in a phone number "1 212 505 3456", the first digit '1' identifies the destination country (in this case, the USA), the next three digits '212' identify the area code (New York City), the next three digits '505' identify an exchange, which is generally a block of phone lines serviced by a particular central office, and the remaining four digits '3456' identify a particular phone line served by that central office. If someone in San Francisco dials this phone number, the phone switch to which that person's terminal is connected does not immediately connect directly to the destination phone line. Rather, it selects a trunk line based on the area code '212' and policy known to the switch, generally selected via a table in the switch or via a lookup in a routing database. This trunk might connect directly to a peer switch in New York, or it might connect to a transit switch that serves to aggregate traffic leaving San Francisco. In this latter case, several such trunk-selection operations might occur, with several switches being traversed, before the call reaches New York. Further such lookup operations connect the call to the called party's central office, which selects a physical copper wire pair to activate, thereby ringing the called party's phone.

For Internet telephony, the circuit-establishment operation of a PSTN is replaced by use of a packet-switched Internet Protocol (IP) network, such as the Internet itself, to convey the telephone call between the two parties. IP networks do not natively use phone numbers. Instead, they use IP addresses, which are 32 (IPv4, specified by RFC 791) or 128 (IPv6, specified by RFC 2460) binary digit strings.

In a typical Internet telephony scenario, a user places a call to a destination telephone number. The Internet telephony terminal connects to a destination IP address (possibly through a series of intermediate IP addresses before reaching that destination) and establishes the phone call. One or more gateway devices that adapt between VoIP and circuit-switched telephony devices may be also be traversed in the process. To route a call it is necessary to evaluate which IP address, or sequence of IP addresses, should be employed to reach a destination. In practice, several such determinations can be made, possibly once at each intermediate device.

Since telephony users typically associate other users with E.164 format telephone numbers and do not associate other users with IP addresses, it is necessary for an Internet telephony service to be able to translate an E.164 format number to an IP address associated with a called party. To address this, ENUM (specified by RFC 3761) is used. ENUM is the Electronic or E.164 Number Mapping standard used to determine Internet communications servers for servicing a given telephone number. ENUM uses a simple lookup in the Domain Name System (DNS) to translate a telephone number into a Uniform Resource Identifier (URI) or IP address that can be used for packet-switched network communications.

The DNS (specified by RFC 1035) is a naming system for computers and other resources associated with the Internet. The DNS translates domain names, which are meaningful to humans, into the numerical identifies which make up the IP address of the node. For example, with the DNS, hostnames such as "www.uspto.gov" are translated using a distributed database into IP addresses (like "151.207.245.67" for www.uspto.gov).

A URI is a string of characters used to identify a name of a resource on the Internet. One form of URI is a Uniform Resource Locator (URL) that specifies where an identified resource is available and the mechanism for retrieving it. An example of a URL used by the World Wide Web is "http://www.uspto.gov" and for email addresses is "usptoinfo@uspto.gov". With these sort of identifiers, an application (a web browser or email server) typically uses the DNS to convert the identifier into an IP address.

A further consideration in routing of Internet telephony calls is the possibility that the destination for a particular call may be either on an IP network or it may be on the PSTN. If the called party is on the PSTN then access from the IP network to the PSTN is achieved through a gateway, which converts packet-switched VoIP to circuit-switched conventional telephony.

While ENUM provides a basic lookup mechanism for translating telephone numbers to IP addresses, it fails to address a fundamental distinction between the common deployments of Internet Telephony and other Internet applications. Most Internet applications use connection routing entirely at the IP address layer. In this approach, each IP switching element (called a "router") examines each received packet, examines its IP address, and forwards it towards a destination based on comparing that address with a routing table. This works very well for network traffic that is not particularly delay-sensitive. However, VoIP applications tend to be delay sensitive. For example, if Alice is talking to Bob, and a congested router delays the voice stream from Alice, Bob will hear the problem, either as a skip in the speech, a burst of noise, or some other anomaly. This scenario is addressed by using Quality of Service (QoS), which is a resource reservation control mechanism for providing priority to different applications in a packet-based network, to guarantee a certain level of performance to a data flow. Consequently, Internet telephony providers in practice establish preferred network links between each other, along with specialized peering agreements (contacts) that govern the use of these links. Such peering agreements are also used to establish service level contracts for gateway services used to convert calls from IP to switched PSTN services. Typically, when a call is originated on IP, the originating service provider must select from a range of possible peers to terminate that call by gatewaying it back to the PSTN. The ordered set of IP addresses to be traversed to place a call to a destination terminal is known as the route vector.

In summary, when establishing the route vector to route a call originating from an Internet telephony terminal where the called party is identified by a telephone number, operational and commercial constraints require making routing decisions based on other factors in addition to simple "shortest path" routing. To dynamically select a path across a network, decisions are generally based on a wide range of factors, including current network load, measured latency and loss, contractual relationships between telephony service providers, level of service contract priorities, and other factors. These decision-influencing factors and the rules that determine how they apply to the routing of calls are collectively termed "policy".

In practice, telephony service providers accumulate large databases of policy information relating to the routing of telephone calls. Such databases, along with the mechanisms needed to query the databases from a telephone call routing point, are collectively termed a "registry". Registries must process many call routing requests in a short period of time, and in general are performance-constrained, thereby impacting the efficiency of the service providers entire system.

For example, two service providers may have a peering agreement that specifies a first fixed rate for an initial number of call-minutes per month, and a second higher fixed rate for additional minutes. To make a call routing decision between this peer and another possible peer not only are the destination addresses needed, but also the terms of the contracts, the number of minutes already used this month and comparable information about other possible peers. All this information should be delivered as quickly as possible to a server that is making a routing decision.

This invention provides a data structuring and access mechanisms to allow routing of phone calls using telephone numbers or telephone number prefixes in accordance with both shortest-path routing and supporting peering policy.

SUMMARY OF THE INVENTION

According to a first aspect of the invention there is provided a telephone number registry comprising: a server; and an associated data store storing resolution data associated with telephone number strings, the resolution data being held in a tree data structure and a data index map, wherein the tree data structure comprises parent nodes and leaf nodes, each parent node of the tree data structure having ten child nodes and the tree data structure storing an index associated with each telephone number string; and the data index map storing resolution data referenced by the indices.

The telephone number registry may be used for routing Internet telephony calls; calls either only originating or terminating at an Internet telephony user terminal; calls originating and terminating at a traditional fixed line or mobile/cell user terminal which are routed partially via a packet-switched network such as the Internet; and for calls originating and terminating at a traditional fixed line or mobile/cell user terminal which are routed wholly via the PSTN.

The tree data structure may further store an index associated with a prefix or with each of a plurality of prefixes of telephone number strings, the data index map also storing resolution data such as routing and/or policy attributes represented by these indices. The indices may be integers.

The tree data structure may be stored in one or more of an internal node memory-mapped file and one or more of a leaf node memory-mapped file, the or each internal node memory-mapped file storing row structures comprising child nodes and a data block for holding any index associated with the parent node of the child nodes; and the or each leaf node memory-mapped file storing data blocks, each data block holding the index associated with a telephone number string.

The tree data structure may be stored in a plurality of internal node memory-mapped files of a first predetermined file size and in a plurality of leaf node memory-mapped files of a second predetermined file size.

The data blocks may be allocated memory of a first predetermined number of bytes. The nodes of the tree data structure may be allocated memory of a second predetermined number of bytes.

The first and second predetermined number of bytes may be four. The four bytes of the parent nodes and of the nodes representing the last digit of the telephone number strings of the tree data structure may store a pointer, one byte of the pointer representing a memory-mapped file number and the three remaining bytes of the pointer representing a row number of the referenced file.

The pointer for each parent node may point to a row structure in one of the internal node memory-mapped files.

The pointer for each node representing the last digit of a telephone number string may point to a data block stored in one of the leaf node memory-mapped files.

The resolution data may be routing and/or policy data, such as one or more of the following attributes:
  a Carrier of Record for the associated telephone number string/telephone number string prefix;
  an indication if the telephone number string/telephone number string prefix has been ported to a different carrier;
  Local Routing Number (used by the PSTN to facilitate routing of numbers that have been ported from one carrier to another);
  transit carriers (carriers who terminate calls to that number or to numbers in that range but are not the Carrier of Record) for the associated telephone number string/prefix;
  pricing data such as the rate per billing increment, call-setup charges, the lengths of the first and subsequent billing increments;
  the type of user terminal equipment at the dialled number such as fax machine, mobile/cell and fixed line telephone;
  the time-zone of the dialling code; and
  other geopolitical information (e.g. country, region).

The server may comprise: a network interface for receiving a request to resolve one or more candidate termination point/node (at an edge of a packet-switched network) associated with a specified telephone number string; and a controller, the controller being configured to: traverse the tree data structure to aggregate the index associated with the telephone number string and any index associated with a prefix or prefixes thereof; query the data index map to obtain resolution data such as the routing and/or policy data/attributes represented by the aggregated index or indices; and generate a route vector comprising the one or more candidate termination node based on the obtained resolution data. The controller may be further configured to use signalling to set up a call to the specified telephone number string via one of or the candidate termination node, or the signalling and call setup may be handled by a different server.

According to a second aspect of the invention there is provided a telephony system comprising: a first telephony user terminal; and a registry as described above for receiving a request from the first telephony terminal to resolve one or more candidate termination node.

According to a further aspect of the invention there is provided an Internet telephony system comprising: an Internet telephony user terminal for connecting with a second telephony terminal over a packet-switched network; and a registry as described above, the registry being associated with the Internet telephony user terminal to provide an Internet telephony service to the Internet telephony user terminal, the registry comprising: a network interface for receiving a request from the Internet telephony user terminal to place a call to a telephone number associated with the second telephony terminal; and a controller, the controller being configured to: traverse the tree data structure to aggregate the index associated with the telephone number string and any index associated with a prefix or prefixes thereof; query the data index map to obtain the resolution data referenced/represented by the aggregated index or indices; and generate a route vector based on the obtained routing and/or policy attributes.

According to a further aspect of the invention there is provided a carrier medium carrying a data structure for use in telephony for providing resolution data such as routing and/or policy data associated with telephone number strings, the data structure comprising a data tree structure and a data index map, wherein the tree data structure comprises parent nodes and leaf nodes, each parent node of the tree data structure having ten child nodes and the tree data structure storing an index associated with each telephone number string; and the data index map storing the resolution data represented by the indices.

According a further aspect of the invention there is provided a method of telephony comprising: providing a server; and providing an associated data store storing resolution data associated with telephone number strings, the resolution data being held in a tree data structure and a data index map, the tree data structure comprising parent nodes and leaf nodes, each parent node of the tree data structure having ten child nodes and the tree data structure storing an index associated with each telephone number string; and the data index map storing resolution data referenced by the indices; receiving at the server a request to place a call to and/or to resolve one or more candidate termination node for a specified telephone number; traversing the tree data structure to aggregate the index associated with the telephone number string and any index associated with a prefix or prefixes thereof; querying the data index map to obtain the resolution data referenced by the aggregated index or indices; and generating a route vector comprising the one or more candidate termination node based on the obtained resolution data.

The method may further comprise using signalling to set up a call to the specified telephone number string via one of or the candidate termination node.

According to a further aspect of the invention there is provided a carrier medium carrying computer readable code for controlling a microprocessor to carry out the method described above.

According to further aspects of the invention there are provided a telephony registry, a telephony system, a carrier medium for use in telephony and a method of telephony as described above for use with Internet telephony.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can comprise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any conventional carrier medium. The carrier medium can comprise a transient carrier medium such as an electrical, optical, microwave, acoustic or radio frequency signal carrying the computer code. An example of such a transient medium is a TCP/IP signal carrying computer code over an IP network, such as the Internet. The carrier medium can also comprise a storage medium for storing processor readable code such as a floppy disk, hard disk, CD ROM, magnetic tape device or solid state memory device.

BRIEF DESCRIPTION OF THE DRAWINGS

The invention will be further described by way of example with reference to the accompanying drawings in which:

FIG. 5 is a representation of an extract of an internal node memory-mapped file being one of the internal node memory-mapped files of FIG. 3;

FIG. 6 is a representation of an extract of a leaf node memory-mapped file being one of a leaf node memory-mapped files of FIG. 3;

FIG. 7 is a representation of a data index map of FIG. 2;

DETAILED DESCRIPTION OF EMBODIMENTS

Figure 1:
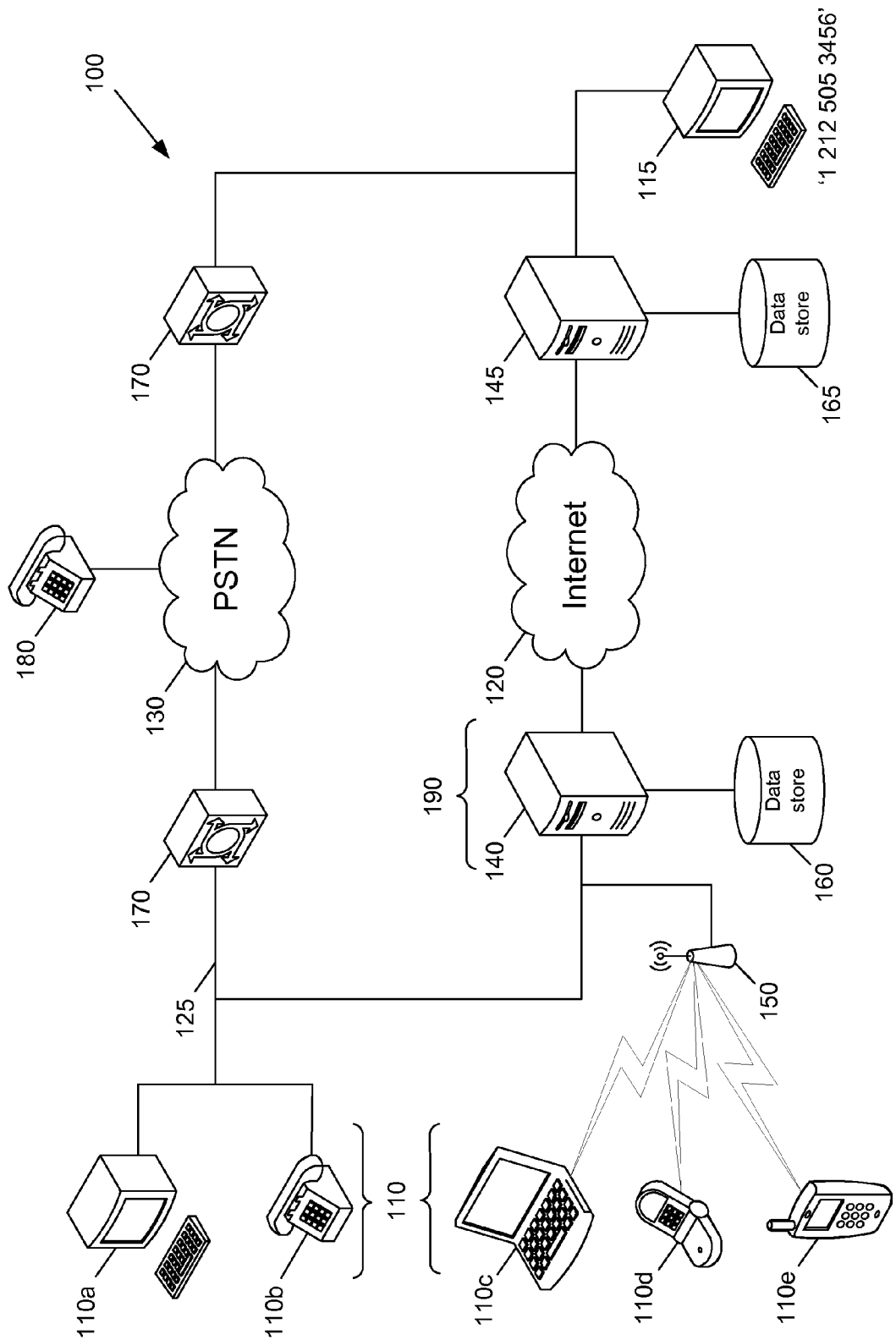
FIG. 1 is a block diagram schematically illustrating an Internet telephony system forming an embodiment of the invention.

FIG. 1 is a block diagram schematically illustrating an Internet telephony system 100 forming an embodiment of the invention. The system permits Internet telephony users to place calls from Internet telephony user terminals 110 over either a packet-switched network, such as the Internet 120, or over a public switched telephone network (PSTN) 130, depending on the destination terminal of the call. The user terminals 110 may comprise one or more of a personal computer (PC) 110a, a fixed line telephone 110b having a suitable adaptor (not shown) for use as a Voice over Internet Protocol (VoIP) enabled phone, a laptop computer 110c, a mobile/cell phone 110d, a smart phone/personal digital assistant (PDA) 110e and other devices known to the skilled person for making an Internet telephony call. The skilled person will understand that a user terminal may be loaded with software so that it is arranged to be used as an Internet telephony device. Furthermore, one or more of the user terminals 110 may be adapted for use as a multimedia Internet telephony terminal, i.e., to transmit services in addition to voice telephony, e.g., video. The telephone 110b is shown as being a wired telephone and the skilled person will understand that a wireless fixed line telephone, e.g., using the Digital Enhanced Cordless Telecommunications (DECT (RTM)) standard, may also be used with the present invention.

The user terminal 110 is connected by means of a communications network 125 to a server 140 which may be operated by an Internet telephony service provider (ITSP). The user terminals 110a, 110b may be connected via a wired connection to the network 125 of the ITSP. Alternatively, the user terminals 110c, 110d, 110e may be connected wirelessly to the network 125 of the ITSP, via a base station 150. The skilled person will understand that the wireless connection may conform with any suitable wireless standard, such as WiFi (RTM), mobile analogue and digital communications (2G, 3G (RTM) etc) and BlueTooth (RTM).

The server 140 includes any desired kind of hardware resources including, for example, a central processing unit (CPU)/controller 200, a random access memory (RAM) (not shown) and a hard disk drive (HDD) (not shown). The CPU may be implemented by any desired kind or any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device including a network interface (all not shown), depending on the type of the apparatus. Alternatively, the HDD may be provided outside of the apparatus as long as the HDD is accessible. The CPU, such as a cache memory of the CPU, and the RAM may function as a physical memory or a primary memory of the apparatus, while the HDD may function as a secondary memory of the apparatus.

The server 140 is connected to a persistent data store 160. The data store 160 may be physically located close to the server 140 or the data store 160 may be physically located remote from the server 140. In the former case, the data store 160 may form part of the server 140. The data store 160 is described in further detail below. The server 140 and data store 160 together make up a registry 190, which provides routing data and associated policy data required to connect a call to a destination number.

The system 100 may comprise one or more further server 145 with an associated data store 165. The servers 140, 145 are interconnected via a packet-switched network such as the Internet 120 and may be physically remote from each other, e.g., in different countries or continents. One or more user terminal, such as a PC 115, may be associated with the further server 145 to make and receive Internet telephony calls by means of the server 145.

The system 100 may comprise one or more gateways 170 which connect the packet-switched network 125 to the PSTN 130 in order to connect to a plain old telephone service (POTS) telephone 180.

In use, a user initiates a call from an Internet telephony user terminal 110, typically by dialling a telephone number in the E.164 number format. The user terminal 110 sends a request via the packet-switched network 125 to the server 140 to place a call to the destination number. The server 140 queries a memory to obtain the IP address corresponding to the E.164 number format telephone number. The memory may be part of the server 140 or part of the data store 160, as discussed below. Once the IP address of the called party is retrieved, the call is routed via the Internet 120, as is known in the art.

The above process is followed when the called party is a telephony user terminal (VoIP, POTS or mobile/cell) having an associated IP address, such as user terminal 115 or POTS user terminal 180 having PSTN gateway 170 fronting the called number and whose IP address is provided by a transit provider or carrier of record. If there is no entry in the registry 190 for the called party, the call will be rejected either with a 'null' response or with a 'route via PSTN' response.

Figure 2:
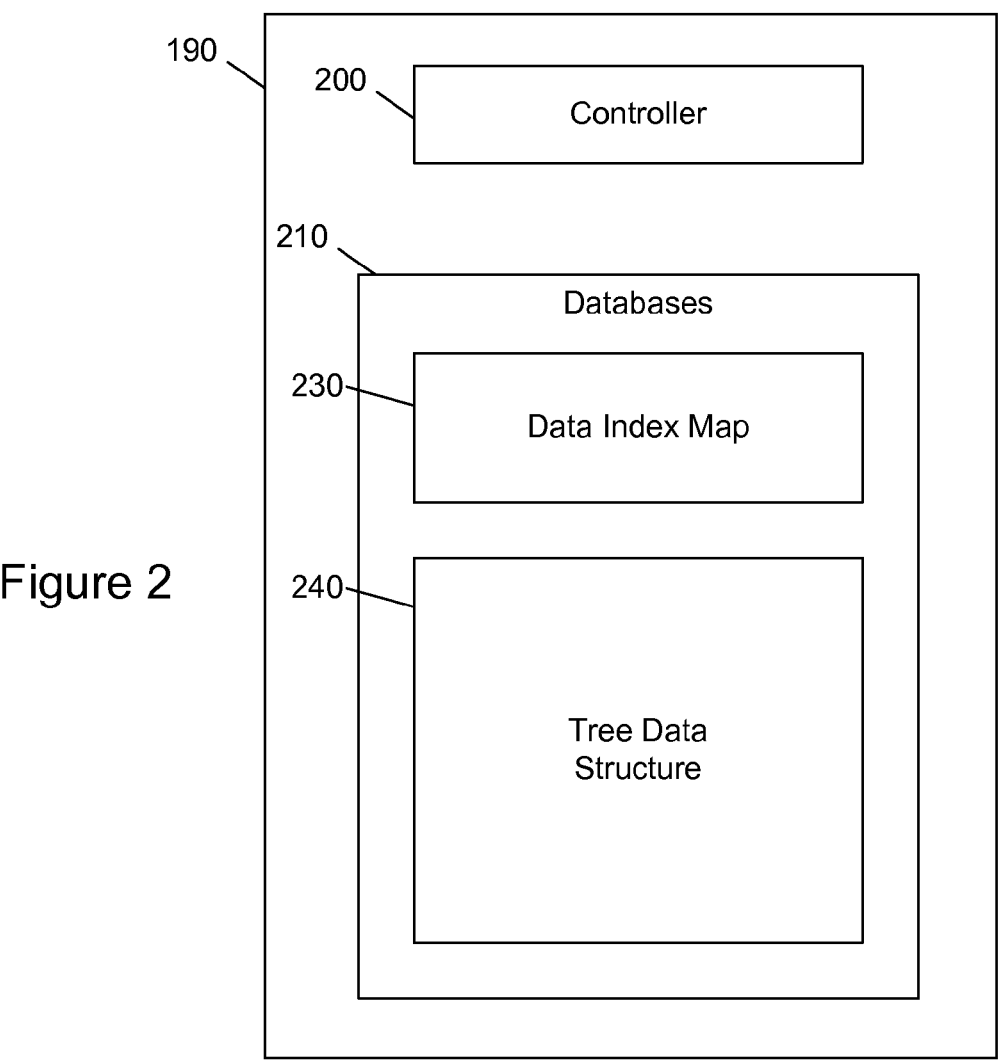
FIG. 2 is a schematic representation of functional blocks of a registry of the system of FIG. 1.

FIG. 2 is a simplified schematic representation of functional blocks of the registry 190, which resides in hardware between the server 140 and the data store 160 of FIG. 1. The registry 190 comprises a controller 200 for processing requests received by the registry 190 and databases 210 which are accessed by the controller 200 when the registry 190 is queried. The databases 210 comprise two databases, namely a data index map database 230 and a tree data structure database 240, each of which is described in greater detail below. The relative sizes of the databases 230, 240 in FIG. 2 is indicative merely of the fact that the data index map database 230 is typically smaller than the tree data structure database 240. (The different sizes of the databases 210 in FIG. 2 should not be taken as an indication of the comparative sizes of the databases 210.)

The phone number registry 190 typically holds a very large amount of mappings. For example, the US number-portability database alone holds hundreds of millions of distinct phone numbers. The skilled person will understand that since the databases 210 may be used to support multi-national phone numbers, this would lead to the number of entries being many times greater than the US number database.

In addition, there will be resolution data such as routing data and policy data associated with each telephone number string. Furthermore, there may also be resolution data associated with one or more prefix of a telephone number string in addition to resolution data associated with the (full) telephone number string. For example, for the string '1 212 505 3456', there may be resolution data such as routing and policy data associated with the '1' prefix (US), the '1212' prefix (New York City), the '1212505' prefix (local exchange) and one or more of the prefix strings '12125053', '121250534', '1212505345' of the last four digits '3456'. Hence, there is a variable size, and often large, amount of resolution data to be stored for each telephone number string.

In addition, the potentially complex nature of resolution data and the potential time sensitivity of the lookup mean that while data store memory footprint is of concern, the overall efficiency of lookup is of more importance and should be the focus of optimization. The particulars of the data, being telephone numbers, are also borne in mind for the databases 210. According to an embodiment of the invention, the databases 210 having the structure described below provide benefits of search speed, memory footprint and data security. According to an embodiment of the invention, the data associated with a telephone number can be persisted in the data store 160 and updated and retrieved quickly, and in particular following start-up of the system or the relevant part thereof.

Figure 3:
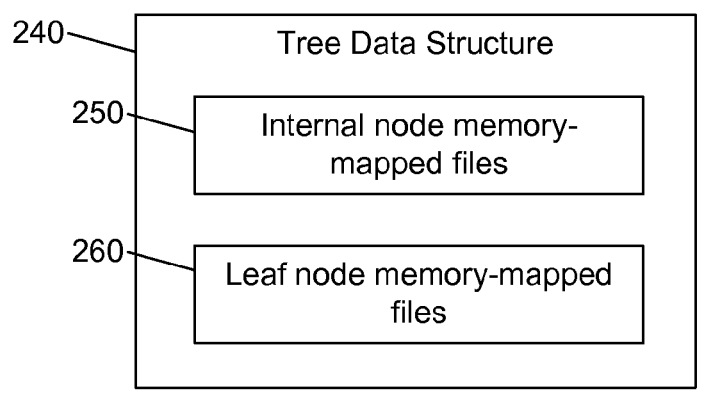
FIG. 3 is a schematic representation of functional blocks of a tree data structure of FIG. 2.

FIG. 3 is a simplified schematic representation of functional blocks of the tree data structure database 240 of FIG. 2. The tree data structure database 240 comprises internal node memory-mapped files 250 of a first predetermined file size and leaf node memory-mapped files 260 of a second predetermined file size.

Figure 4:
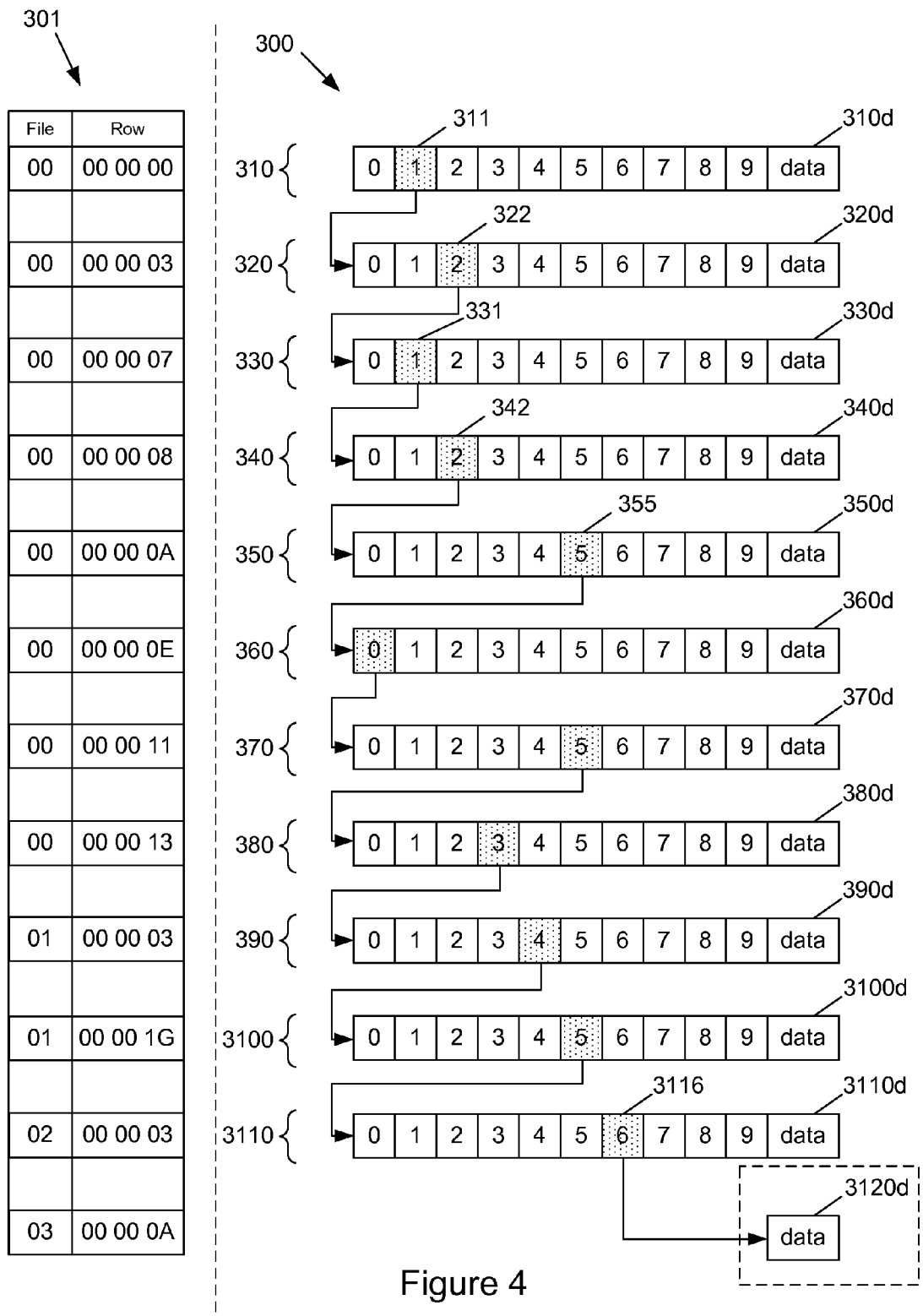
FIG. 4 shows a tree data structure for a telephone number record distributed over a number of internal node memory-mapped files of FIG. 3.

FIG. 4 shows a tree data structure 300 for the telephone number record/string '1 212 505 3456' distributed over a plurality of the internal node memory-mapped files 250 of FIG. 3, as an example of how index data is stored in the tree data structure database 240. A data block 3120d shown in a broken line at the bottom of FIG. 4 does not form part of the internal node memory-mapped files 250 but forms part of the leaf node memory-mapped files 260 of FIG. 3, as is explained below.

The tree data structure 300 is a denary tree, where each parent node of the data structure 300 has ten child nodes. Each level of the tree data structure 300 is a row structure comprising 10 nodes '0' to '9' and a data block 310d-3110d, as is explained in greater detail below. Considering the node '1' 311 in the top level 310 of the tree data structure 300, this node 311 points to the row structure 320 having ten nodes and a data block 320d in the second level of the tree data structure 300. Each node of the second level row structure 320 is a candidate child node of the parent node '1' 311 of the first row structure 310. Each of the nodes '0' to '9' of the second row structure 320 has ten child nodes. For the example shown in FIG. 3, only the child nodes of the '2' parent node 322 of the second row structure 320 are shown as row structure 330, which is in the third level of the tree data structure 300. The skilled person will understand that there can be up to 9 other sets of child nodes '0' to '9' (not shown) and associated data blocks (not shown) for the nodes '0', '1' and '3' to '9' of the second row structure 320. Similarly, only the ten child nodes of node '1' 311 of the top level are shown and each of the other nodes '0' and '2' to '9' of the top level 310 may have child nodes (not shown) and associated data blocks (not shown), and similarly for every internal/parent node in the tree, which may have up to ten child nodes.

Hence, the skilled person will understand that although the representation of the tree data structure 300 of FIG. 3 is a view of eleven levels within the internal node memory-mapped files 250 representing the path followed for the telephone number '1 212 505 3456', the internal node memory-mapped files 250 may comprise many more similar row/contiguous structures at each level, which 'widen' each level of the tree data structure 300 as the tree branches out along different paths. In particular, there may be up to 10 similar row structures in the second level, up to 100 in the third level and up to $10^{(n-1)}$ in the $n^{th}$ level.

Each data block 310d-3110d at the end of the nodes '0' to '9' is allocated four bytes (a first predetermined number of bytes) in the internal node memory-mapped file 250. Each node '0' to '9' of the tree data structure 300 is allocated four bytes (a second predetermined number of bytes) in an internal node memory-mapped file 250. Hence, in each row structure 310-3110 of the tree data structure 300, the nodes '0' to '9' are allocated 40 bytes of data in total. Since the data block 310d-3110d is allocated 4 bytes in its internal node memory-mapped file 250, then each row structure 310-3110 is allocated 44 bytes in its internal node memory-mapped file 250, thereby providing a known offset between row structures.

The rows 310-3110 of the tree data structure 300 are stored end-to-end. Since each row 310-3110 is of a known, equal length of bytes, the tree data structure 300 lends itself to be stored in multiple memory-mapped files as fixed-size data objects. A memory-mapped file is a file whose contents (in all or in part) are mapped byte-for-byte to a section of an application's virtual memory. The application can thus refer to the memory as if it were any contiguous array of bytes, while the operating system takes care of writing changes to non-volatile memory and reading data in from non-volatile memory when the application tries to access recorded that have not been loaded into the volatile memory. The allocation of the tree data structure 300 to fixed-size internal node memory-mapped files simplifies memory storage.

An advantage of using memory-mapped files for the tree data structure database 240 is that the large volume of data stored in the tree data structure database 240 and used for keying into the resolution data index map 230 can be persisted without time-consuming load and store procedures when the application is started up and shut down, respectively. Rather, data is loaded and stored one memory-page at a time on an as-need basis, so that only the necessary data is transferred (down to the granularity of a memory page), and those transfers are spread out in time such that their impact on performance is not noticeable. A further advantage is that the application need not contain explicit code for this operating system feature (other than the initial setup of the mapping), since it is all handled behind-the-scenes by the operating system of the controller 200.

Each row structure 310-3110 of the tree data structure 300 and the other row structures of the internal node memory-mapped files 250 is addressed using a file number (corresponding to the file number of the memory-mapped file) and a row number, as shown in the table 301 next to the tree data structure 300. The file number and row number in table 301 are shown in hex format, i.e., each two digit number has a size of one byte. In the embodiment shown in FIG. 4, there is one byte allocated to the file number and three bytes are allocated to the row number within that file. The skilled person will understand that different numbers of bytes can be allocated to each of the file and row numbers, depending on the size of the tree data structure database 240.

For the tree data structure 300 of FIG. 4, the first row/upper level 310 is stored at row '00 00 00' of memory-mapped file number '00' of the internal node memory-mapped files 250; the second row 320 is stored at row '00 00 03' of file number '00' of the memory-mapped files 250; and so on for the remaining rows 330-3100 of the tree data structure 300 up to the last row 3110, which is stored at row '00 00 03' of file number '02' of the memory-mapped files 250. The skilled person will understand that the intervening rows of the internal node memory-mapped files are allocated to other row structures of the internal node memory-mapped files 250 not forming part of the path defined by the phone number key '1 212 505 3456'.

The entry stored in each of the nodes '0' to '9' of the internal "parent" node memory-mapped files 250 is a pointer to the next "child" row structure of the tree data structure. For the example shown in FIG. 4, the entry stored in the four bytes of the node '1' 311 of the top level 310 of the tree data structure 300 is '00 00 00 03', i.e., a pointer to row '00 00 03' of file '00' of the memory-mapped files 250. The second digit of the called number is '2'; once the second row 320 is reached at file '00' and row '00 00 03', bytes 9 to 12 are read from this row structure (since bytes 1 to 4 of this row are the entry for the node '0' and bytes 5 to 8 of this row are the entry for the node '1'). The entry stored in the four bytes of the node '2' 322 of the second row 320 of the tree data structure 300 is '00 00 00 07', i.e., a pointer to row '00 00 07' of file '00' of the memory-mapped files 250. We then move to row '00 00 07' of file '00' and read bytes 5 to 8, which are the entry for the digit '1' 331 of the third row 330, which is the next digit '1' in the destination telephone number; these four bytes are a pointer to row '00 00 08' of file '00'.

The path through the internal node memory-mapped files 250 continues to bytes 9 to 12 of row 340, which is the entry of '2' 342 of this row, which points to row '00 00 0A' of the same file, number '00'; from there to bytes 21 to 24 of row 350, which is the entry of '5' 355 of this row, which points to row '00 00 0E' of file '00'; and so on through each of the shaded nodes of the tree data structure 300 up to bytes 25 to 28 of row 3110 at file number '02' row '00 00 03', which is the entry for '6' 3116 (being the final digit of the destination phone number '1 212 505 3456'), whose entries are a pointer to file '03', row '00 00 0A' of the leaf node memory-mapped files 260.

In this embodiment a data block 310d-3110d, of length four bytes, is associated with each set of nodes '0' to '9' and is appended to the end of the 40 bytes allocated in the internal node memory-mapped files 250 to these nodes. The skilled person will understand that a different number of bytes can be allocated to each node and to each data block. A value stored in the bytes of the data block 310d-3110d is a resolution data index which is associated with the parent node which points to the row in which the data block resides. For example, the data block 320*d* is associated with the node '1' 311 in the top level 310; the data block 330*d* is associated with the node '2' 322 in the row structure 320 of the second level; the data block 340*d* is associated with the node '1' 331 in the level three row structure 330 etc. The entries in the data blocks are indices which are mapped in the data index map 230 of FIGS. 2 and 7. The entries in the data blocks 310*d*-3110*d* may be null entries, i.e., where no routing and/or policy data is associated with that prefix. For example, if the entry is a null entry then this may be implemented by storing an integer index which does not have a corresponding entry in the data index map 230. Alternatively, the controller 200 can be configured to ignore these null entries, i.e., not to reference the data index map 230 when encountering a null entry.

FIG. 5 shows an extract 250*a* of one of the files of the internal node memory-mapped files 250 of FIG. 3. In this embodiment the tree data structure 240 comprises a plurality of internal node memory-mapped files 250. In other embodiments, the tree data structure may comprise a single internal node memory-mapped file (for example where the tree data structure only stores a small number of telephone numbers or where a large file size is chosen).

The extract 250*a* shows the first 24 rows of the first memory-mapped file forming part of the internal node memory-mapped files 250. The extract 250*a* covers the first seven digits of the tree data structure 300 of FIG. 4, i.e., the first seven digits '1212505' of the destination phone number '1 212 505 345'. The row numbers '00 00 00' to '00 00 17' 270 are shown next to each row of records. With reference to FIG. 4, the first row structure 310 is stored in row '00 00 00'; the second row structure 320 is stored in row '00 00 03'; the third row structure 330 is stored in row '00 00 07'; the fourth row structure 340 is stored in row '00 00 08'; the fifth row structure 350 is stored in row '00 00 0A'; the sixth row structure 360 is stored in row '00 00 0E'; and the seventh row structure 370 is stored in row '00 00 11'.

The extract 250*a* contains further rows which do not form part of the tree data structure 300 of FIG. 4. For example, the entry for digit '0' in the first row 310 may point to row '00 00 01' and the entry for digit '2' may point to row '00 00 02'. The skilled person will understand that the internal node memory-mapped files 250 may contain many pages/files similar in structure to the extract 250*a* of the first page/file shown in FIG. 5.

In this case, each internal node memory-mapped file is allocated space of 44×256³ bytes and each leaf node memory-mapped file is allocated space of 4×256³ bytes. More generally, for cases where the element size of the memory-mapped file (row structure of the internal node memory-mapped file) is not as specified above but of length p (where for the internal node memory-mapped file p is 11q, where q is the number of bytes of each node=the number of bytes of the data block at the end of the row structure) and r is the number of bytes of each pointer, the size of each memory-mapped file is p·×256$^{(r-1)}$ bytes. This means that each file is exactly large enough to hold the maximum number of elements of the type it contains that can be addressed by a pointer. Dividing the tree memory up in this way makes for near-maximum space efficiency (the maximum extra space allocated is the sum of the maximum file size—the size of one element for each element type) while incurring no processing overhead as would be incurred were we to use flexible file sizes or to mix element types within a file.

Each of the leaf node memory-mapped files 260 of FIG. 3 comprises data blocks storing indices associated with the full called number, i.e., with the last digit of the called number. With reference to FIG. 4, since there are no further digits after the last digit '6' of the called number, the last node '6' 3116 of row 3110 is a leaf/external node which does not point to further child nodes but points to the memory location of a data block 3120*d*. The address of the data block is file '03' row '00 00 0A' of the leaf node memory-mapped files 260 and an index associated with the full called telephone number is stored in the data block 3120*d*.

FIG. 6 shows an extract 260*a* from one of the leaf node memory-mapped files 260 of FIG. 3. The extract 260*a* is located at page/file '03' of the memory-mapped files 260. In this embodiment the tree data structure 240 comprises a plurality of leaf node memory-mapped files 260. In other embodiments, the tree data structure may comprise a single leaf node memory-mapped file (for example where the tree data structure only stores a small number of telephone numbers or where a large file size is chosen).

The extract 260*a* comprises a plurality of data blocks, including data block 3120*d* at memory location row '00 00 0A'. The row number '00 00 0A' to '00 00 10' 280 of each row of the memory-mapped file is shown next to each data block. The extract 260*a* also comprises further data blocks 290 which are associated with the last digit of telephone numbers other than '1 212 505 3456'.

Each of the data blocks 310*d*-3120*d*, 290 holds a four byte index. The skilled person will understand that the length of the index may be less or more than four bytes. The indexes are mapped to attributes in the data index map 230 of FIG. 2. In the present embodiment, telephone numbers and prefixes thereof are mapped to four byte integers for use as indices into the data index map 230, rather than allowing more generalized objects such as strings. This simplifies the storage management, and precludes having to serialize arbitrary objects into byte arrays for storage in a memory-mapped file, and then unserialize them on retrieval.

Due to the different sizes associated with internal and leaf nodes, these nodes are purposely separated into two types of memory-mapped files resulting in the fact that any non-empty tree will require at least two files—one for the internal nodes and one for the leaf nodes.

The entirety of the tree data structure may thus be stored in a plurality of internal node memory-mapped files containing row elements and in a plurality of leaf node memory-mapped files containing leaf elements.

FIG. 7 is a representation of an extract 230*a* of data index map 230 of FIG. 2, which maps an index 232 held in data blocks 310*d*-3120*d*, 290 to attributes. Entries are shown only for index values '00 00 00 00' to '00 00 00 0A' of the resolution data index map 230. (For the sake of clarity only the least significant byte of each data block is shown in FIG. 7.)

Each index 232 is mapped to one or more telephone number attribute 233. For example, the index '00 00 00 00' 232*a* (shown in FIG. 7 merely as '00') maps to attributes AT1, AT2, AT3 and AT4; the index '00 00 00 01' 232*b* maps to attributes AT1; the index '00 00 00 02' 232*c* maps to attributes AT5 and AT6; the index '00 00 00 0A' 232*d* maps to attributes AT4, AT13, AT2 and AT1; and so on.

The routing and/or policy attributes 233 represented by each index may be one or more of the following sample number range details:

the Carrier of Record for the associated telephone number/ telephone number prefix;

an indication if the telephone number/telephone number prefix has been ported to a different carrier;

Local Routing Number (used by the PSTN to facilitate routing of numbers that have been ported from one carrier to another);

transit carriers for that telephone number (carriers who terminate calls to that number or to numbers in that range but are not the Carrier of Record);

pricing data such as the rate per billing increment, call-setup charges, the lengths of the first and subsequent billing increments, etc. (these are typically constant across whole countries, and thus will be much "higher up the tree" than the actual rates);

the type of user terminal equipment at the dialled number, e.g., fax machine, mobile/cell, fixed line telephone;

the time-zone of the dialling code; and other geopolitical information (e.g. country, region).

The skilled person will understand that as new numbers are added to the databases 210, the tree data structure database 240 will likely grow at a much faster rate than the data index map 230. This is because as a new telephone number is added to the tree data structure database 240, the index associated with the full telephone number (and the index/ices associated with one or more prefix thereof) may already exist in the data index map 230. For example, the new telephone number may have the same combination of ownership, pricing, geopolitical data, etc. as a telephone number already stored in the registry, which is likely to be shared by many telephone numbers (e.g. all those in a given geographical area or all those owned by a given carrier). In such a case there will be no increase in size of the data index map 230.

The skilled person will further understand that the data associated with a first telephone number and a prefix or prefixes thereof may be of different length compared to the data associated with a second telephone number and a prefix or prefixes thereof. Since this data is stored in the data index map 230, then the variable length of this data for different numbers will not affect the fixed-length data structure of the records in the tree data structure database 240, thereby providing predictability and ease of access to the records of the tree data structure database 240.

The order-of-magnitude of searching for a given number in the databases 210 is determined solely by the lesser of:

the number of digits in the telephone number being searched, and the depth of the section of the tree data structure where information about the number, if any, can be found, irrespective of the number of telephone numbers contained in the tree data structure database 240. I.e., unlike many data structures the order-of-magnitude of the search is not a function of the number of elements in the structure.

Since the data index map 230 is of relatively small size, in operation this database 230 is held in the volatile memory of the microprocessor based controller 200, i.e., in the volatile memory of server 140, to provide quick read and write access.

Due to the large size of the tree data structure database 240, it is not practical to hold the entire database in volatile memory. Hence, the tree data structure is stored in its entirety in non-volatile memory (disc or other non-volatile memory) of the data store 160. A consequence of holding the tree data structure database 240 in non-volatile memory 160 is that the access speed is less than if the tree data structure database 240 is held entirely in non-volatile memory of the controller 200.

To address this, the tree data structure database 240 is loaded page-by-page from the non-volatile memory into the volatile memory associated with the controller 200 as necessary when a telephone number is queried. The skilled person will understand that a 'page' of data loaded from the data store 160 to the volatile memory is not necessarily an entire memory-mapped file (internal or leaf node) described above. Rather, the size of the page of data loaded from the data store 160 is determined by the operating system of the server 140. The page of the tree data structure database 240 loaded into the volatile memory will persist in the volatile memory until the operating system of the server 140 overwrites the data.

Consequently, at any one time, a copy of part of the tree data structure database 240 is likely to reside in the volatile memory associated with the controller 200 whilst the entirety of the tree data structure database 240 (a 'master' copy) resides in the non-volatile memory of the data store 160. In practice, similar telephone numbers, i.e., telephone numbers with the same prefixes (typically corresponding to a geographical area, e.g., New York City) are likely be called more frequently than telephone numbers from disparate geographical locations. Hence, whilst a page of the memory-mapped file of the tree data structure database 240 is loaded in the volatile memory associated with the controller 200, it is likely that that page will be referenced repeatedly whilst it resides in the volatile memory.

In use, when the registry 190 is booted up, the server 140 loads the data index map 230 from the data store 160 into volatile memory of the server 140. The server 140 may also load some pages of the memory-mapped tree data structure database 240 from the data store 160 (both from the internal node 250 and the leaf 260 node memory-mapped files), for example based on pages which were referenced prior to shut down of the registry 190. As the registry 190 performs number retrieval, pages of memory are loaded from the data store 160 into the volatile memory of the server 140 and less-used pages in the volatile memory of the server 140 are overwritten by the operating system as required.

When the registry 190 receives a request in relation to a called telephone number, the controller 200 queries the pages of the internal node memory-mapped files 250 of the tree data structure database 240 which have been copied to the volatile memory, by starting at the top level of the internal node memory-mapped files 250 and descending through the tree data structure until all nodes corresponding to the called telephone number are traversed or until it reaches a point in the tree that has no pointer corresponding to the next digit in the telephone number—whichever comes first. If a copy of the relevant pages of the internal node memory-mapped files 250 does not reside in the volatile memory of the registry 190 then these pages are copied from the data store 160 to the volatile memory. As the controller 200 walks through the copied pages of the internal node memory-mapped files 250, it aggregates/accumulates indices stored in the data blocks associated with the traversed nodes, up to and including the index associated with the full telephone number, which is stored in one of the leaf node memory-mapped files 260.

For example, with reference to FIG. 1, a user of PC user terminal 110a initiates a voice telephone call to user terminal 115, having telephone number '1 212 505 3456', by entering the telephone number at the Internet telephony user terminal 110a or by activating a record held in a contact list stored in the user terminal 110a. The user terminal 110a sends data to the server 140 including the telephone number string, to request initiation of a VoIP session with the user terminal 115 associated with the called telephone number. The server 140 receives the data from the user terminal 110a to request initiation of the VoIP session and the controller 200 queries the tree data structure database 240 to obtain the indices associated with the called telephone number.

With reference to FIG. 4, the controller 200 starts retrieval at node '1' 311 in the top level 310 of the tree data structure tree 300 and reads the entry held at that node 311, which points the controller 200 to the file and row of the internal node memory-mapped file 250 containing the second node '2' 322. The controller 200 continues the lookup by moving the pointer to the file and row of row structure 320 of the internal node memory-mapped file 250 and reads the entry held at node '2' 322, which points the controller 200 to the file and row of the internal node memory-mapped file 250 representing the third digit '1' 331 of the telephone number string. Before moving the pointer to the third node 331, the controller 200 checks the data block 320d at the end of the row structure 320 to determine if there is an index stored in the bytes of the data block 320d. If there is an index stored in these bytes then the controller 200 reads and stores the index, this being the index associated with the prior parent node '1' 311.

The controller 200 moves the pointer to the file and row of row structure 330 and reads the address entry held at node '1' 331, which points the controller 200 to the file and row representing the fourth digit '2' 342. Before moving the pointer to the fourth node 342, the controller 200 reads any index stored in the data block 330d at the end of the row structure 330, which would be the index associated with the prior parent node '2' 322. The controller 200 continues this process through each of the remaining nodes representing the remaining digits of the dialed telephone number, accumulating any indices held in the data blocks 340d-3110d along the way. Once the controller 200 reads the entry stored in the node 3116 corresponding to the last digit '6', the controller moves the pointer to the file and row of the leaf node memory-mapped file 260 where the associated data block 3120d is found and reads the index held therein, which is the index associated with the full telephone number '1 212 505 3456'.

It can be seen that by walking through the tree data structure 300 in this way, all the indices associated with prefixes and the index associated with the full telephone number are collated, and the retrieval speed search time is independent of the amount of data stored in the tree and dependent on the lesser of the length of the telephone number string searched for and the depth of the corresponding sub-tree.

Once the controller 200 has aggregated the indices stored in the data blocks 310d-3120d, the controller queries the data index map database 230 to obtain the attributes 233 corresponding to the aggregated indices. Once the attributes 233 have been aggregated, the controller 200 "superimposes" attributes 233 from further down the tree onto those from further up. This results in a composite attribute set with all of the information, less any conflicts, in which case the data lower down the data structure is preferred.

Referring back to FIG. 1, once the routing and policy data attributes 233 have been obtained from the data index map 230, the server 140 generates a route vector containing potentially multiple candidate termination points/nodes associated with the telephone number that is queried. Each candidate termination point is the last point on the IP network 'closest' to the called telephone terminal. Where the called telephone number is an IP telephony user terminal the termination node may be the IP address of the terminal. This route vector may be returned to the querying entity for routing or may be acted upon by the server 140, in which case the server 140 sends a session initiation request in accordance with route vector preference to the appropriate termination point or points. For example, the session initiation request is sent to one of the IP addresses of the carrier who services the user terminal associated with the full telephone number or a prefix thereof. This addressing information is stored in another database associated with the server 140 using standard IP telephony techniques, as will be understood by a person skilled in the art.

It can be seen that the step of obtaining the data associated with a telephone number is performed by reference to a single database (the data index map database 230) by a single lookup operation by the controller 200 to collect the attributes 233 associated with the relevant indices 232. This provides an efficient retrieval mechanism compared to an alternative method of retrieving associated data stored together with each prefix of a telephone number.

Ensuring the integrity of persistent data is an onerous task undertaken by a typical database-management system (DBMS), whether a relational (RDBMS) or object-oriented (ODBMS) database-management system. The simplicity of the present invention's data structure in combination with the atomic or sequential or synchronous nature of memory-mapped disc writes allows the impact of this issue to be minimised, leading to improved performance. Each update to the databases 210 is a series of bytes written to memory that is mapped to non-volatile memory. The operating system writes any changed pages—and only changed pages—to non-volatile memory 160. The likelihood of a non-volatile memory write being interrupted mid-page is small, but even were it to happen the "dangling" pointers (pointers that do not point to valid object of the appropriate type) that result would likely still point to valid addresses in the memory-mapped files, albeit without useful data. Stated otherwise, since the memory location being pointed to by any pointer never changes, should a read attempt occur while a write attempt is taking place (possibly corrupting the data at that memory location) the application would nonetheless not crash, as is typical with dangling pointers. A subsequent update of the missing or corrupted information would leave the good data unchanged and pick up where the last update left off, completing the desired changes. Even in the worst cases, some numbers would be missing, but all the others would be untouched. This is in contrast to prior art data structures where corruption of a data record can affect all subsequent stored data. Hence, in an embodiment of the invention an error due to corrupt data can be corrected merely by rewriting that data record rather than wiping and rewriting the entire memory-mapped file.

Since data is loaded as needed and used "as is", there is no danger of building inconsistent or incorrect internal structures were something to go wrong during a load.

As can be seen from FIG. 5, a telephone number is represented in the internal node memory-mapped files 250 as "random" or non-contiguous memory addresses containing pointers. The telephone number is in essence a set of pointer offsets and not a string found anywhere in memory, thereby making it very hard to decipher from the memory-mapped files the data associated with the telephone number stored in the tree or in its equivalent memory, thereby providing for an added measure of security.

In an embodiment of the invention, the allocation of memory is further simplified by not attempting to reclaim space in the event of deletions of telephone number records. In practice, deletions are rare events, and should a memory-mapped file ever become significantly fragmented an application can be run to defragment the file.

Memory-mapped files are not simply allocated once for each type of element (internal and leaf nodes). If this were the case then one would have to either allocate enough memory to contain some upper limit of elements—which is either wasteful or restrictive—or one would have to occasionally "grow" the file by allocating a larger file, copying all the data from the existing file to the new file and deleting the existing file. Instead, a fixed number of elements are allocated for the initial memory-mapped file and further memory-mapped files of the same size are created when the existing file or files are full. To understand this better, the flowcharts 800 and 900 in FIGS. 8 and 9 respectively show the procedure for adding new numbers to the registry 190.

Figure 8:
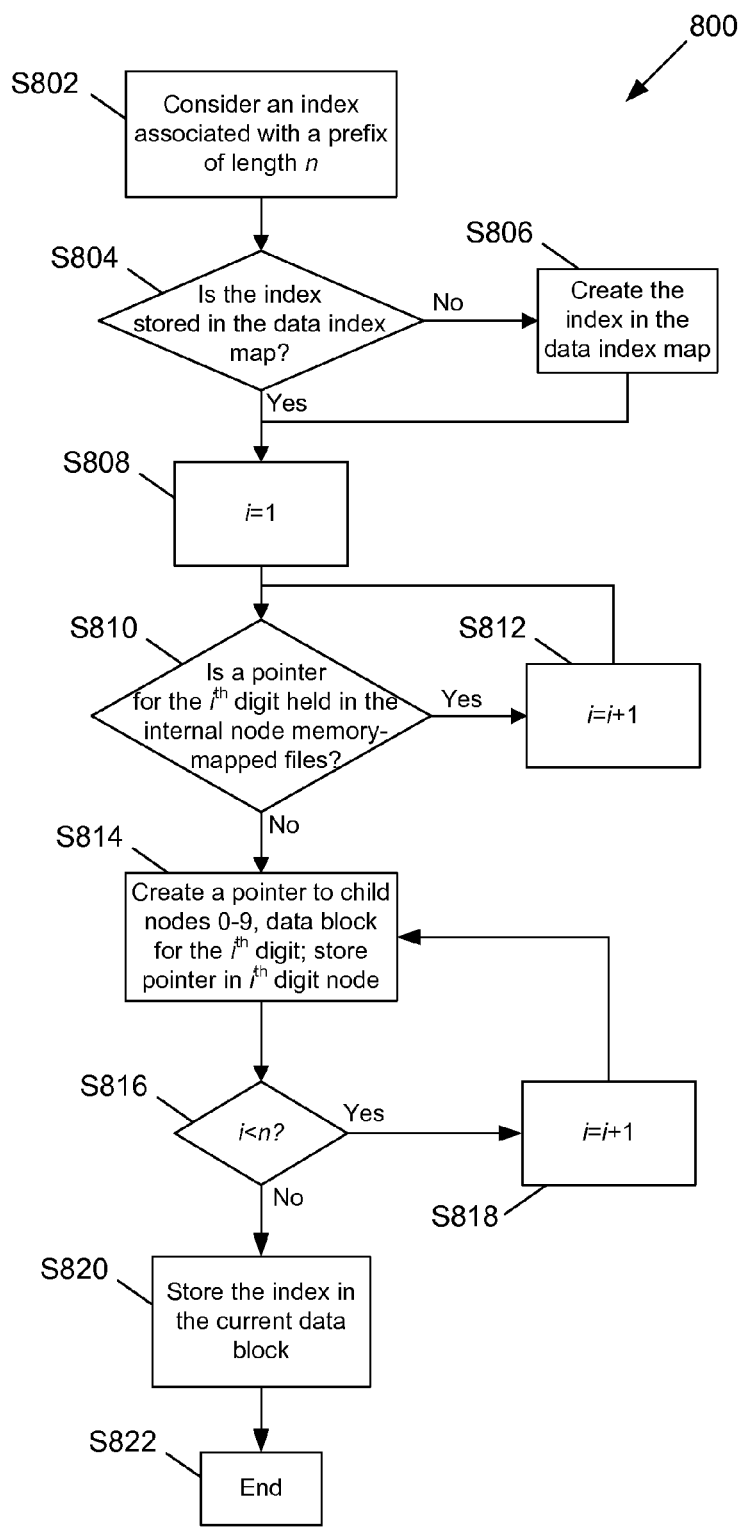
FIG. 8 is a flowchart showing a process for adding an index associated with a prefix of a telephone number record to the registry databases of FIG. 2.

When a new telephone number is added to the data structure, new entries are created in both one of the internal node memory-mapped files 250 and in one of the leaf node memory-mapped files 260. The new telephone number will have an index associated with the full telephone number and may have an index associated with one or more prefix of the telephone number. FIG. 8 shows the process for adding a new prefix to the internal node memory-mapped files 250.

In step S802, a prefix of length n digits to be added to the registry 190 is identified along with its associated index. In step S804, the controller 240 checks the data index map database 230 to determine if the index is present in the database 230. If the index is not present in the data index map database 230 then in step S806 the missing index is added to the data index map database 230. The process then proceeds to step S808, where the reference i (an index) is initialised by the controller 200 as i=1.

At step S810, the controller 200 checks if a pointer for the $1^{st}$ digit of the prefix is held in the internal node memory-mapped file (where there is only a single internal node memory-mapped file) or in one of the internal node memory-mapped files 250 (where there are a plurality of internal node memory-mapped files 250). If the controller 200 determines that a pointer for the $1^{st}$ digit is held in the or in one of the internal node memory-mapped files 250 then the process proceeds to step S812, where the controller increments the reference i.

Steps S810 and S812 are repeated until the controller 200 determines that a pointer for a subsequent digit is not held in the or in one of the internal node memory-mapped files 250. When the controller 200 determines that a pointer for the subsequent digit is not held in the or in one of the internal node memory-mapped files 250 then the process proceeds to step S814, where the operating system (not shown) of the controller 200 posts a request to the non-volatile memory 160 (e.g., disc drive) to create in the or in one of the internal node memory-mapped files 250, at a specified file number and row, child nodes '0' to '9', of total length 40 bytes, and a data block, of length 4 bytes, associated with the parent node. The new entries are typically added at the end of the last memory-mapped file. Since the internal node memory-mapped files 250 are not built sequentially, it is evident that node storage will almost never be contiguous on a page of memory. A pointer to the child node '0' (at the beginning of the row of the new data records) is then stored in the parent node in the memory-mapped file, and the child nodes '0' to '9' are populated with null pointers. These child nodes are null leaf nodes until they become a root of a sub-tree.

The process then proceeds to step S816, where the controller 200 checks if all of the digits of the prefix have been processed.

If the controller 200 determines that not all of the digits of the prefix have been processed then at step S818 the reference i is incremented and the process returns to step S814 where the controller creates the child nodes '0' to '9' for the present digit and the data block. The null pointer in the parent node is replaced with a pointer to the newly created child node '0'. Steps S814 to S818 are then repeated until the controller has created records and stored pointers for all digits of the prefix, at which point the process proceeds to step S820.

Once all row structures of the prefix have been created in the internal node memory-mapped files 250, the index associated with the prefix is stored in the last created data block at step S820, after which the process terminates at step S822.

Note that once the controller 200 determines at step S810 that a pointer is not held in the internal node memory-mapped files 250 then the process proceeds to create pointers for all the remaining digits of the prefix. This is because once it has been determined that no path has been created for a digit of a prefix, then by definition there will not be any records for the subsequent digits and it will be necessary to create the sub-tree beneath the newly created internal node.

The skilled person will appreciate that a path through the tree data structure may be stored over one or more internal node memory-mapped files 250.

If there is an index associated with one or more further prefix of the new telephone number being added to the tree data structure database 240, then the process 800 is repeated for each prefix.

A data index associated with a prefix may be amended. Also, a new data index may be added for an existing prefix. In such cases it is clearly not necessary to create nodes but merely necessary to respectively amend or add the data index stored in the relevant data block.

Figure 9:
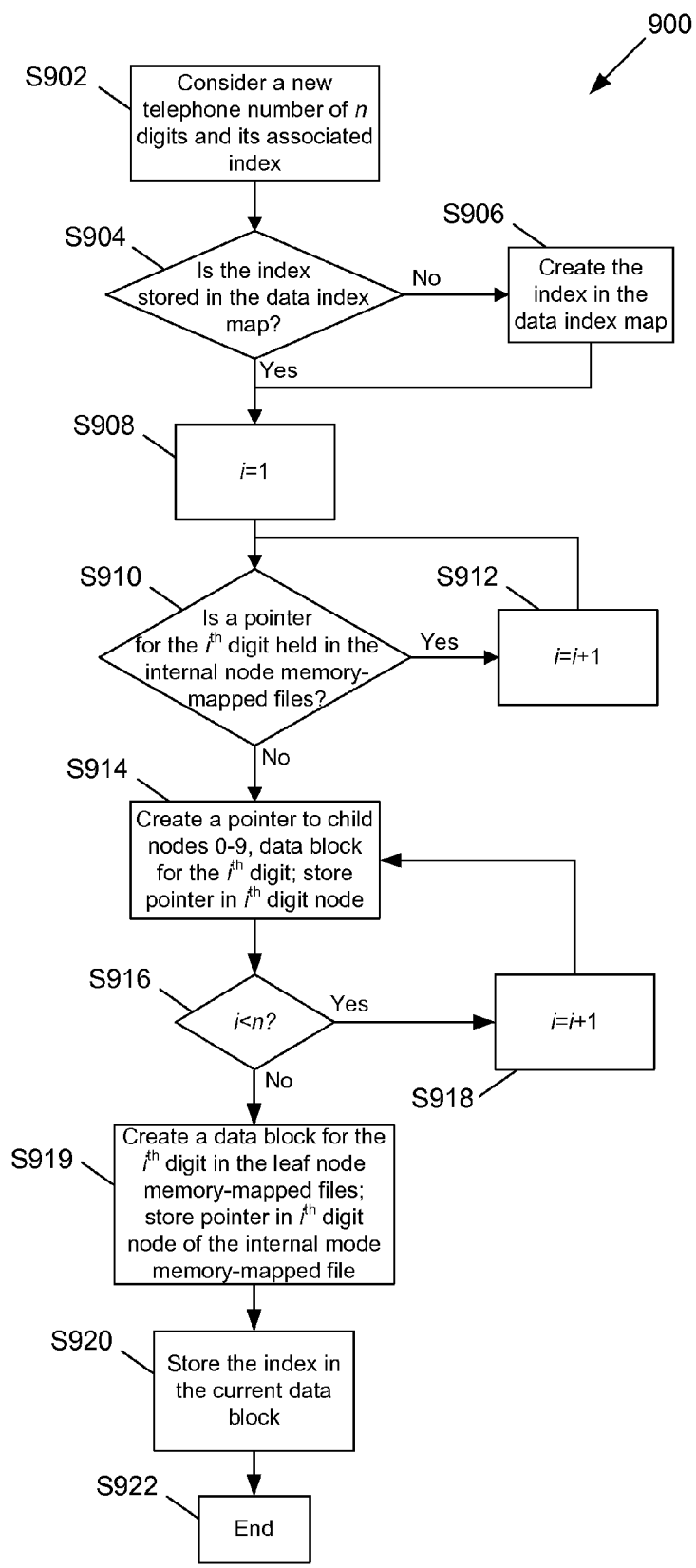
FIG. 9 is a flowchart showing a process for adding a new telephone number record to the registry databases of FIG. 2.

Once the process for adding indices associated with a prefix or prefixes of a new telephone number is complete, a similar process is followed to add the new telephone number to the tree data structure database 240, as described with reference to FIG. 9.

In step S902, a new telephone number of length n digits to be added to the registry 190 is identified along with its associated index. In step S904, the controller 240 checks the data index map database 230 to determine if the index is present in the database 230. If the index is not present in the data index map database 230 then in step S906 the missing index is added to the data index map database 230. The process then proceeds to step S908, where the reference i (an index) is initialised by the controller 200 as i=1.

At step S910, the controller 200 checks if a pointer for the $1^{st}$ digit of the new telephone number is held in the or in one of the internal node memory-mapped files 250. If the controller 200 determines that a pointer for the $1^{st}$ digit is held in the or in one of the internal node memory-mapped files 250 then the process proceeds to step S912, where the controller increments the reference i.

The process repeats steps S910 and S912 until the controller 200 determines that a pointer for a subsequent digit is not held in the or in one of the internal node memory-mapped files 250. When the controller 200 determines that a pointer for the subsequent digit is not held in the or in one of the internal node memory-mapped files 250 then the process proceeds to step S914, where the operating system (not shown) of the controller 200 posts a request to the non-volatile memory 160 (e.g., disc drive) to create in the or in one of the internal node memory-mapped files 250, at a specified file and row, child nodes '0' to '9' and a data block associated with the parent node. As before, the new entries are typically added at the end of the last memory-mapped file. A pointer to the child node '0' (at the beginning of the row of the new data records of length 44 bytes) is then stored in the parent node in the memory-mapped file, and the child nodes '0' to '9' are populated with null pointers. These child nodes are null leaf nodes until they become a root of a sub-tree.

The process then proceeds to step S916 where the controller 200 checks if all of the digits of the new telephone number have been processed.

If the controller 200 determines that not all of the digits of the new telephone number have been processed then the controller 200 increments the reference i and the method returns to step S914 where the controller creates the child nodes '0' to '9' for the present digit and the data block. The null pointer in the parent node is replaced with a pointer to the newly created child node '0'. Steps S914 to S918 are then repeated until the controller has created records and stored pointers for all digits of the new telephone number, at which point the process proceeds to step S919.

At step S919 a data block is created in the or one of the leaf node memory-mapped files 260 and a pointer to that data block is stored in the $i^{th}$ digit node of the internal node memory-mapped file 250.

Once all fixed length row structures of the new telephone number have been created in the or in one of the internal node memory-mapped files 250 and the data block associated with the last digit of the new telephone number has been created in the or in one of the leaf node memory-mapped files 260, the index associated with the prefix is stored in the newly created data block of the leaf node memory-mapped files 260 at step S920, after which the process terminates at step S922.

As above, the skilled person will appreciate that a path through the tree data structure may be stored over one or more internal node memory-mapped files 250.

Various modifications will be apparent to those in the art and it is desired to include all such modifications as fall within the scope of the accompanying claims.

For example, in the embodiment of FIG. 1, the call is placed by a first Internet telephony-enabled user terminal 110 via an IP packet-switched network 120 to a second Internet telephony-enabled user terminal 115. In other embodiments, the call may be placed from an Internet telephony-enabled user terminal 110 via an IP packet network and a PSTN to a POTS user terminal 180 or a mobile/cell user terminal.

In other embodiments the call may be placed from a POTS user terminal 180 or a mobile/cell user terminal via a PSTN and an IP packet network to an Internet telephony user terminal 110, 115. In other embodiments the call may be placed from a POTS user terminal 180 or a mobile/cell user terminal via a PSTN, an IP packet-switched network and via a different PSTN or different part of the PSTN to a POTS user terminal 180 or a mobile/cell user terminal, i.e., the call originates and terminates on the PSTN and is routed via the IP packet network. In both of these cases the registry is associated with a gateway 170 at an interface between the PSTN and the IP packet network.

In the embodiment of FIG. 1, the registry 190 generates a route vector and provides a signalling function to effect call termination. In other embodiments, the registry may generate a route vector by resolving possible termination points for the specified telephone number and the signalling function may be provided by other signalling apparatus.

In still other embodiments, the registry 190 returns a single IP address for use in ownership validation of a telephone number.

In still other embodiments, the registry 190 returns a routing number that is associated with a telephone number for use in PSTN routing of numbers that have been ported to a new carrier.

In still other embodiments, the registry 190 returns a number indicating a "hit" count associated with a telephone number.

In still other embodiments, the registry 190 returns one or more call detail records that are associated with a telephone number.

In still other embodiments, the registry 190 returns an amount of money that is associated with a telephone number. This could be credit or amount owed by the owner of said number.

In still other embodiments, the registry 190 returns a list of attributes that may be associated with a telephone number.

As should be evident by the plethora of embodiments presented above, this patent can cover mappings between a telephone number and resolution data of just about any form, as the tree structure stays the same and the resolution data is always referenced by an index in this same tree structure.

The data structure described above and with reference to FIGS. 2 to 9 is described in the context of Internet telephony. In other embodiments, the data structure can be used to provide routing and/or policy data for use with a traditional, non IP-based, telephone service. I.e., the tree data structure described above can be used for storing resolution data such as routing and/or policy data associated with any telephone number in any telephony system.

In addition to or in place of the resolution data being routing and/or policy data associated with a telephone number string or telephone number prefix string, the resolution data may be other data associated with a telephone number such as an IP address associated with the number string, billing information associated with the number string or any other string of text/numbers associated with the telephone number string or telephone number prefix string.

The invention claimed is:

1. An Internet telephony telephone number registry comprising:
   a server; and
   an associated data store storing a tree data structure and one or more resolution data elements associated with telephone number strings, the telephone number strings being subsets of or corresponding to an E.164 telephone number sequence,
   wherein the resolution data elements are held in a data index map and are referenced by indices, the indices being stored in the tree data structure and pointing or referring to the resolution data elements in the data index map,
   wherein the resolution data elements are at least one of routing data and policy data comprising one or more of the following attributes:
      a Carrier of Record for the associated telephone number string/telephone number string prefix, an indication if the telephone number string/telephone number string prefix has been ported to a different carrier, Local Routing Number (defined as a number used by the PSTN to facilitate routing of numbers that have been ported from one carrier to another), transit carriers (defined as carriers who terminate calls to that number or to numbers in that range but are not the Carrier of Record) for the associated telephone number string/telephone number string prefix, pricing data such as the rate per billing increment, call-setup charges, the lengths of the first and subsequent billing increments, the type of user terminal equipment at the dialed number such as fax machine, mobile/cell and fixed line telephone, the time-zone of the dialing code, and other geopolitical information,
   wherein the tree data structure comprises a plurality of nodes, each node representing a telephone number string and being classified as one or more of a top level node, a parent node, a child node and a leaf node, the top level nodes including at least one of said parent nodes, each parent node of the tree data structure having ten child nodes, the leaf nodes not having any child nodes and the E.164 telephone number sequences being represented by at least some of the leaf nodes, wherein the indices stored in the tree data structure are either associated with E.164 telephone number sequences or are associated with other telephone number strings, the tree data structure being stored in one or more of an internal node memory-mapped file and one or more of a leaf node memory-mapped file separate from the internal node memory-mapped file or files, wherein the internal node memory-mapped file or files store row structures comprising (i) top level nodes and an associated data block, and (ii) child nodes and an associated data block for holding any index associated with the parent node of the child nodes, and each leaf node memory-mapped file stores data blocks, wherein when the leaf node is associated with an E.164 telephone number sequence the data block holds the index pointing or referring to the resolution data elements associated with the E.164 telephone number sequence and when the leaf node is associated with a telephone number string other than an E.164 telephone number sequence the data block holds the index pointing or referring to the resolution data elements associated with a last digit of the telephone number string.

2. A registry as claimed in claim 1, wherein the tree data structure is stored in a plurality of internal node memory-mapped files of a first predetermined file size and in a plurality of leaf node memory-mapped files of a second predetermined file size.

3. A registry as claimed in claim 1, wherein the data blocks are allocated memory of a first predetermined number of bytes and the top level nodes and the child nodes of the tree data structure are allocated memory of a second predetermined number of bytes.

4. A registry as claimed in claim 3, wherein the first and second predetermined number of bytes is four.

5. A registry as claimed in claim 4, wherein the four bytes of the parent nodes and of the leaf nodes representing the last digit of the telephone number strings of the tree data structure store the index, one byte of the index representing a memory-mapped file number and the three remaining bytes of the index representing a row number of the referenced file.

6. A registry as claimed in claim 5, wherein the index for each node representing the last digit of a telephone number string points to a data block stored in one of the leaf node memory-mapped files.

7. A registry as claimed in claim 1, wherein the indices are integers.

8. A registry as claimed in claim 1, wherein the server comprises:
a network interface for receiving a request to resolve one or more candidate termination node associated with a specified telephone number string; and
a controller, the controller being configured to:
traverse the tree data structure to aggregate the index associated with the telephone number string and any index associated with a prefix or prefixes thereof;
query the data index map to obtain the resolution data referenced by the aggregated index or indices; and
generate a route vector comprising the one or more candidate termination node based on the obtained resolution data.

9. A registry as claimed in claim 8, wherein the controller is further configured to:
use signaling to set up a call to the specified telephone number string via one of or the candidate termination node.

10. An internet telephony system comprising:
a first telephony user terminal; and
a registry as claimed in claim 8, for receiving a request from the first telephony terminal to resolve one or more candidate termination node.

11. A system as claimed in any claim 10, wherein the one or more candidate termination node is an edge node of a packet-switched network.

12. A carrier medium carrying a data structure for use in internet telephony for providing resolution data associated with telephone number strings, the telephone number strings being subsets of or corresponding to an E.164 telephone number sequence, the data structure comprising a tree data structure and a data index map, wherein the tree data structure comprises a plurality of nodes, each node representing a telephone number string and being classified as one or more of a top level node, a parent node, a child node and a leaf node, the top level nodes including at least one of said parent nodes, each parent node of the tree data structure having ten child nodes, the leaf nodes not having any child nodes and the E.164 telephone number sequences being represented by at least some of the leaf nodes, wherein the tree data structure stores indices which are either associated with E.164 telephone number sequences or are associated with other telephone number strings, the tree data structure being stored in one or more of an internal node memory-mapped file and one or more of a leaf node memory-mapped file separate from the internal node memory-mapped file or files, wherein the internal node memory-mapped file or files store row structures comprising (i) top level nodes and an associated data block, and (ii) child nodes and an associated data block for holding any index associated with the parent node of the child nodes, and each leaf node memory-mapped file stores data blocks, wherein when the leaf node is associated with an E.164 telephone number sequence the data block holds the index pointing or referring to the one or more resolution data elements associated with the E.164 telephone number sequence and when the leaf node is associated with a telephone number string other than an E.164 telephone number sequence the data block holds the index pointing or referring to the resolution data elements associated with a last digit of the telephone number string, wherein the one or more resolution data elements are at least one of routing data and policy data comprising one or more of the following attributes:
a Carrier of Record for the associated telephone number string/telephone number string prefix, an indication if the telephone number string/telephone number string prefix has been ported to a different carrier, Local Routing Number (defined as a number used by the PSTN to facilitate routing of numbers that have been ported from one carrier to another), transit carriers (defined as carriers who terminate calls to that number or to numbers in that range but are not the Carrier of Record) for the associated telephone number string/telephone number string prefix, pricing data such as the rate per billing increment, call-setup charges, the lengths of the first and subsequent billing increments, the type of user terminal equipment at the dialed number such as fax machine, mobile/cell and fixed line telephone, the time-zone of the dialing code, and other geopolitical information.

13. A method of Internet telephony comprising:
providing a server;
providing an associated data store storing a tree data structure and one or more resolution data elements associated with telephone number strings, the telephone number strings being subsets of or corresponding to an E.164 telephone number sequence,
wherein the resolution data elements are held in a data index map and are referenced by indices, the indices being stored in the tree data structure and pointing or referring to the resolution data elements in the data index map,
wherein the tree data structure comprises a plurality of nodes, each node representing a telephone number string and being classified as one or more of a top level node, a parent node, a child node and a leaf node, the top level nodes including at least one of said parent nodes, each parent node of the tree data structure having ten child nodes, the leaf node not having any child nodes and the E.164 telephone number sequences being represented by at least some of the leaf nodes,
wherein indices stored in the tree data structure are either associated with E.164 telephone number sequences or are associated with other telephone number strings, the tree data structure being stored in one or more of an internal node memory-mapped file and one or more of a leaf node memory-mapped file separate from the internal node memory-mapped file or files;
wherein the internal node memory-mapped file or files store row structures comprising (i) top level nodes and an associated data block, and (ii) child nodes and an associated data block for holding any index associated with the parent node of the child nodes, and
each leaf node memory-mapped file stores data blocks, wherein when the leaf node is associated with an E.164 telephone number sequence the data block holds the index pointing or referring to the resolution data elements associated with the E.164 telephone number sequence and when the leaf node is associated with a telephone number string other than an E.164 telephone number sequence the data block holds the index pointing or referring to the resolution data elements associated with a last digit of the telephone number string,
wherein the one or more resolution data elements are at least one of routing data and policy data comprising one or more of the following attributes:
a Carrier of Record for the associated telephone number string/telephone number string prefix, an indication if the telephone number string/telephone number string prefix has been ported to a different carrier, Local Routing Number (defined as a number used by the PSTN to facilitate routing of numbers that have been ported from one carrier to another), transit carriers (defined as carriers who terminate calls to that number or to numbers in that range but are not the Carrier of Record) for the associated telephone number string/telephone number string prefix, pricing data such as the rate per billing increment, call-setup charges, the lengths of the first and subsequent billing increments, the type of user terminal equipment at the dialed number such as fax machine, mobile/cell and fixed line telephone, the time-zone of the dialing code, and other geopolitical information,
receiving at the server a request to resolve one or more candidate termination node for a specified telephone number string;
traversing the tree data structure to aggregate the index associated with the telephone number string and any index associated with a subset or subsets thereof;
querying the data index map to obtain the resolution data elements referenced by the aggregated index or indices; and
generating a route vector comprising the one or more candidate termination node based on the obtained resolution data elements.

14. A method as claimed in claim 13, further comprising using signaling to set up a call to the specified telephone number string via one of or the candidate termination node.

15. A method as claimed in claim 13, wherein the one or more candidate termination node is an edge node of a packet-switched network.

16. A non-transitory carrier medium carrying computer readable code for controlling a microprocessor to carry out the method of claim 13.

* * * * *